(12) United States Patent
Devlin et al.

(10) Patent No.: US 10,664,547 B1
(45) Date of Patent: May 26, 2020

(54) CONFIGURABLE SHORT LOCATORS

(71) Applicant: UIPCO, LLC, San Antonio, TX (US)

(72) Inventors: Jonathan Michael Devlin, Richardson, TX (US); Joseph Kessler, Melissa, TX (US); Daniel Thane Davidson, Rexburg, ID (US); Gary Alan Rainwater, McKinney, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 178 days.

(21) Appl. No.: 15/900,540

(22) Filed: Feb. 20, 2018

(51) Int. Cl.
*G06F 16/00* (2019.01)
*G06F 16/955* (2019.01)
*G06F 16/951* (2019.01)
*H04L 29/08* (2006.01)

(52) U.S. Cl.
CPC ........ *G06F 16/9566* (2019.01); *G06F 16/951* (2019.01); *H04L 67/02* (2013.01); *H04L 67/146* (2013.01)

(58) Field of Classification Search
None
See application file for complete search history.

(56) References Cited

U.S. PATENT DOCUMENTS

| 2013/0067115 A1* | 3/2013 | Lapanc | H04L 67/025 709/245 |
| 2014/0280468 A1* | 9/2014 | Duncan | H04L 67/2814 709/203 |
| 2014/0317517 A1* | 10/2014 | Aoki | H04L 67/146 715/738 |
| 2016/0248837 A1* | 8/2016 | Cai | H04L 67/02 |

* cited by examiner

*Primary Examiner* — Son T Hoang
(74) *Attorney, Agent, or Firm* — Fletcher Yoder, P.C.

(57) ABSTRACT

Systems and methods for using parameters with shortened resource locators to access a resource are provided. A short resource locator is associated with a full resource locator template in a resource locator association datastore. Parameters provided with the short resource locator are used to replace one or more parameter identifiers within a full resource locator template to generate a full resource locator. The full resource locator is used to access a resource.

17 Claims, 3 Drawing Sheets

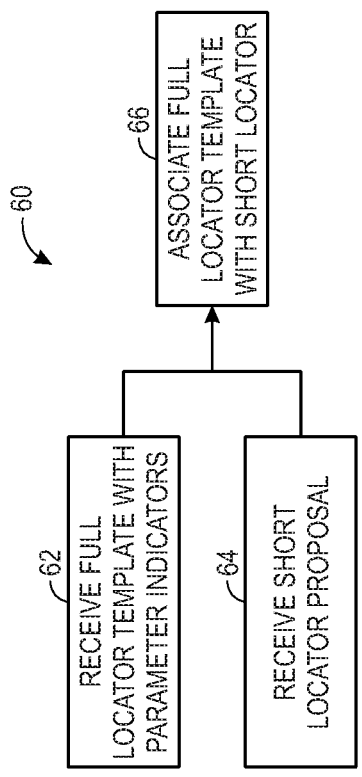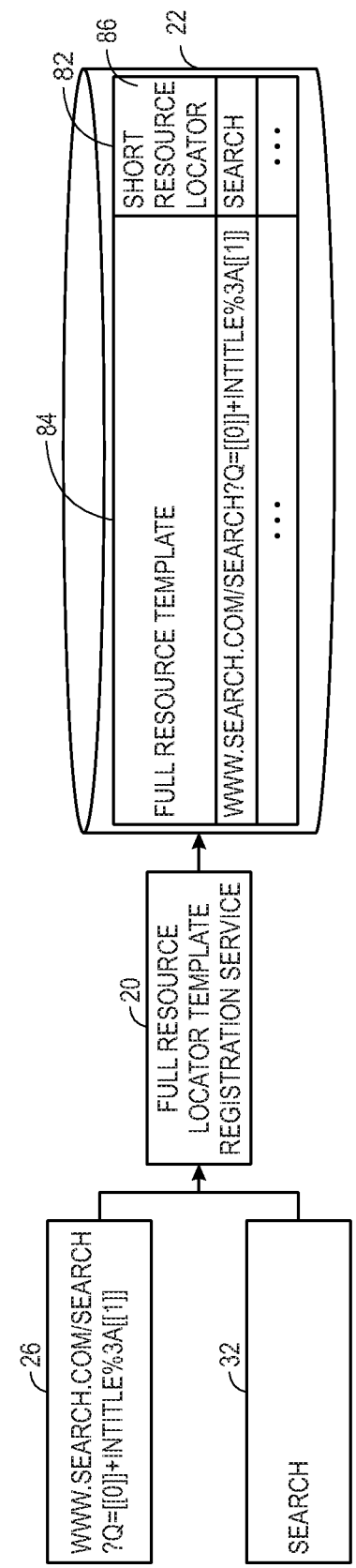

CONFIGURABLE SHORT LOCATORS

BACKGROUND

The present disclosure relates generally to systems and methods for providing flexible short locators. More specifically, the present disclosure relates to systems and methods that enable one or more parameters to be passed via a short locator.

As electronic device networks become increasingly complex, locators (e.g., Uniform Resource Locators (URLs)) may become quite long, requiring memorization of long strings of characters to reach an intended target resource that may be identified based upon the locators. Further, the target resources increasingly utilize complex parameters that control output of the resources. For example, a search engine's URL may provide a multitude of parameters that may be used to control the search and/or the search results provided by the search engine, such as: a query parameter, a parameter to search for a particular string in result titles, URLs, text, results related to a particular string, and the like.

Locator shorteners have been developed to shorten long locators, enabling the use of a shortened locator in place of a long locator. However, these shortened locators typically take in hardcoded parameters of the long locator without providing an ability to alter the hardcoded parameters. It is now recognized that this results in an excessive number of short locators, as a short locator must be generated for each set of hardcoded parameters. For example, a shortened locator would be created for a hardcoded query parameter "car" and a separate shortened locator would be created for a hardcoded query parameter "truck".

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a flowchart, illustrating a process for registering parameter passing short locators, in accordance with embodiments described herein;

FIG. 3 is a block diagram, illustrating an example registration of a parameter passing short locator, using the process of FIG. 2, in accordance with embodiments described herein;

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The current systems and methods provide a flexible locator shortener that enables one or more parameters to be passed, in lieu of use of hardcoded parameters. This may result in significant processing efficiencies, as fewer shortened locators may be generated, stored, and accessed. Accordingly, significant improvements in the computer resource location via locators may be achieved using the current techniques.

Figure 1:
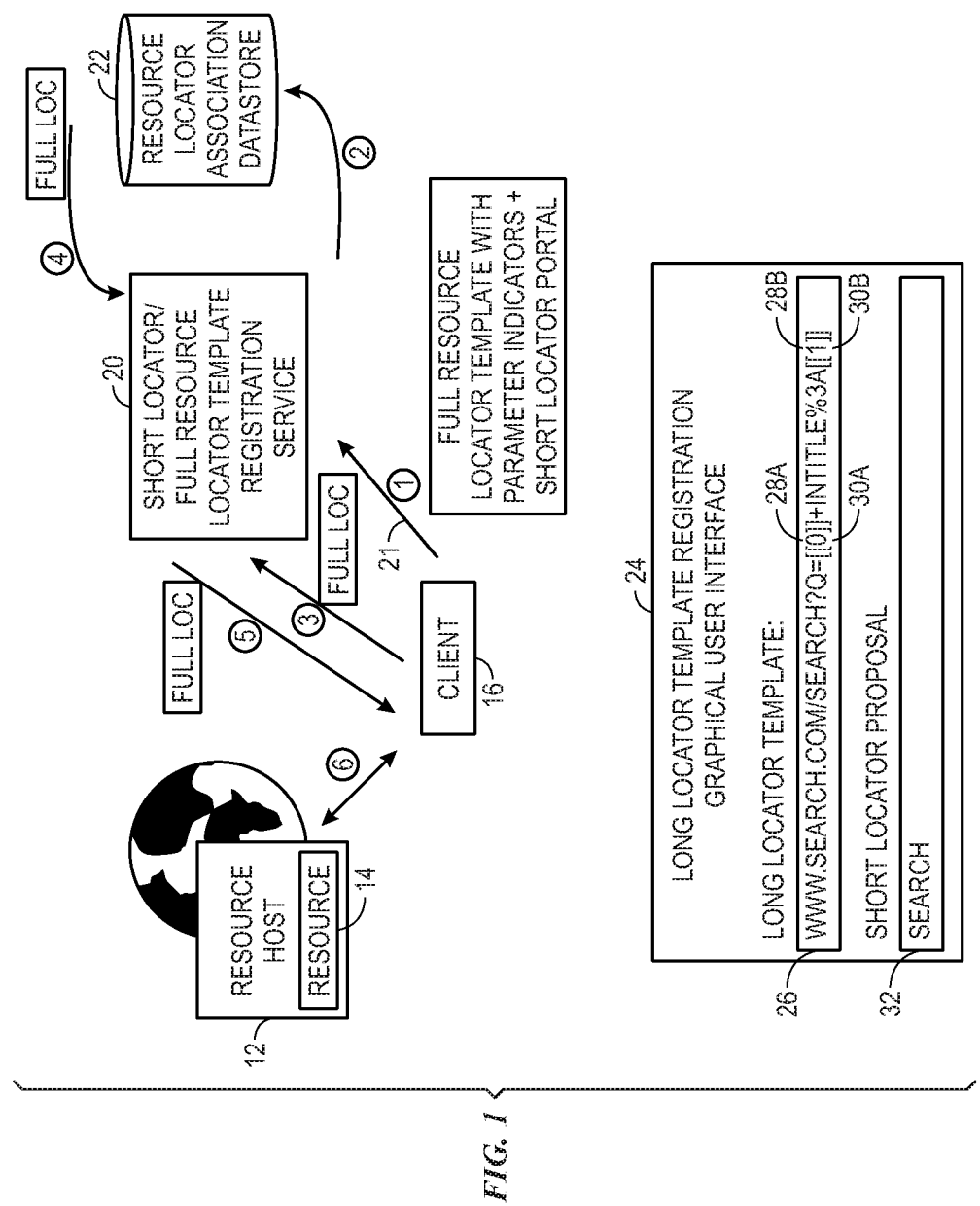
FIG. 1 is a block diagram, illustrating a parameter passing locator shortener system, in accordance with embodiments described herein.

By way of introduction, FIG. 1 is a block diagram, illustrating a parameter passing locator shortener system 10, in accordance with embodiments described herein. As illustrated, a resource host 12 (e.g., a webserver) may host a resource 14 (e.g., a webpage), which may be accessible to a client computer system 16 ("client 16") via a locator (e.g., a Universal Resource Locator (URL) that identifies the resource location on a computer network (e.g., the Internet 18, a local area network (LAN), and/or a wide area network (WAN)). By specifying the resource locator (e.g., a full resource locator that identifies the resource 14 at the resource host 12 and provides any parameters expected by the resource), the client 16 may access the resource 14. For example, a search engine webpage may be accessed by using the full resource locator "www.search.com" and appending search parameters for the search engine webpage, such as "/search?q=cars+intitle%3ABrandX", which may provide a particular query string (e.g., cars) and a particular title search string (e.g., BrandX), where "BrandX" is indicative of a specific car brand.

Unfortunately, it may be difficult to remember full resource locators and their associated parameters, especially for longer resource locators and/or a significant number of parameters. Accordingly, a short resource locator may be implemented, which allows a shorter resource locator to be used in place of the full resource locator. Further, parameters may be passed from the short resource locator, such that different parameters may be used for the same short locator. This may result in more user-friendly and/or system friendly resource locators that may simplify resource access.

For example, instead of "www.search.com/search?q=cars+intitle%3ABrandX", a user or system may specify the shortened locator with associated parameters, such as "search/cars/BrandX". This results in generation of the full resource locator with the parameters passed to the full resource locator. Accordingly, the same shortened resource locator could be used to search for trucks of a different brand (e.g., by specifying "search/trucks/BrandY" as the shortened resource locator).

Registration for Resource Locator Shortening

To generate a shortened resource locator, the full resource locator may be registered (arrow 21) with a short locator service 20, which associates a short resource locator proposal with the full resource locator and parameter identifiers in a resource locator association datastore 22. FIG. 2 is a flowchart, illustrating a process 60 for registering parameter passing short locators, in accordance with embodiments described herein. Further, FIG. 3 is a block diagram, illustrating an example registration 80 of a parameter passing short locator, using the process 60 of FIG. 2. For clarity, FIGS. 2 and 3 will be discussed below in conjunction with FIG. 1.

A graphical user interface (GUI) 24 is shown in FIG. 1 to illustrate registration data for registering the full resource locator for shortened location functionality. However, the GUI 24 is not required. Indeed, in some embodiments, an application programming interface (API) of the short locator service 20 may consume the relevant registration data from a registration device, without the use of the GUI 24. The GUI 24 may be displayed via the client 16, the short locator service 20, or both.

To register the full resource locator, a full resource locator template 26 is provided, substituting parameter identifiers (e.g., 28A and 28B) where parameter portions will be replaced with a passed parameter. This full resource locator template 26 with substituted parameter identifiers (e.g., 28A and 28B) is received (block 62) by the short locator service 20.

The parameter identifiers may include any special combination of characters that are identifiable, by the short locator service 20, as parameter identifiers. In the current embodiment, the string of characters " " respectively open and close each parameter identifier. However, in other embodiments, other strings and/or symbols may be used to identify the parameter portions. For example, "*" or other symbols could open and close the parameter identifiers.

Additionally, in some embodiments, when multiple parameters will be passed, sequential parameter identifiers may be used. The sequential parameter identifiers may include an ordering identification (e.g., 30A and 30B), indicating which parameters provided in the shortened resource locator will be passed to particular parameter indicators in the full resource locator. For example, parameter identifier 28A includes an ordering identification 30A of "0" and parameter identifier 28B includes an ordering identification 30B of "1", indicating that a first passed parameter will be passed to parameter identifier 30A of the full resource locator 26 and that a second passed parameter will be passed to parameter identifier 30B of the full resource locator 26. While the current example illustrates a numerical ordering starting with "0" for the ordering identification 30A, alternative ordering identifiers may be used. For example, the ordering identifiers may be alphabetical characters, starting with "A", numerical values starting with "1", and so forth.

Additionally and/or alternatively, when a parameter is used more than once in a full resource locator template 26, a parameter indicator (e.g., 28A) may be used multiple times in a full resource locator template 26. For example, " " could appear more than once in the full resource locator template 26. This results in a first parameter being passed to both locations where " " is found in the full resource locator template 26.

Along with the full resource locator template 26 and parameter indicators (e.g., 28A and 28B), the registration request may include a proposed short locator 32, here "search", which is received (block 64) by the short locator service 20. In some embodiments, when a proposed short locator 32 is not provided in the registration request, an automated proposed short locator 32 may be generated by the short locator service 20.

In some embodiments, additional data may be captured and stored during the registration process. For example, an indication of the requestor (e.g., a user and/or computer), a time the request is received, etc. may be received.

Upon receiving the registration request, the short locator service 20 may associate (block 66) the proposed short locator 32 with the full locator template 26 having the parameter indicators (e.g., 28A and 28B). For example, these pieces of data may be associated in a database table 82 and stored (arrow 33 in FIG. 1) in the resource locator association datastore 22. In FIG. 3, the database table 82 is shown with two columns, the first column 84 stores the full resource locator template 26 with the parameter indicators (e.g., 28A and 28B) and the second column 86 stores the short locator 32. If the proposed short locator 32 is already associated with another full resource locator, an error message may be provided to the client 16 and/or the short locator service 20 may automatically generate an alternatively proposed short locator 32. The alternatively proposed short locator 32 may then be stored in column 86.

As depicted in FIG. 1, the short locator service 20, in some embodiments, may both register full resource locator templates (e.g., associate the full resource locator template 26 with a proposed short locator 32) as well generate full resource locators based upon received short resource locators and parameters (e.g., using the registered full resource locator templates). However, in other embodiments, the short locator service 20 may be split into two separate services (hosted on separate or common computer systems). One service may perform the registration and another service may provide the full resource locators based upon received short resource locators and parameters.

Resource Access Via Shortened Resource Locator

Figure 4:
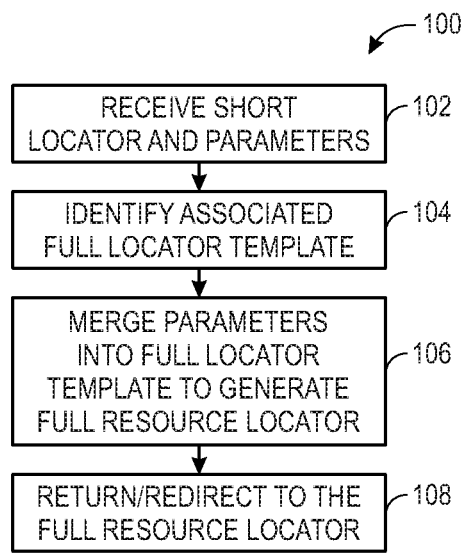
FIG. 4 is a flowchart, illustrating a process for accessing a resource, using a parameter passing short locator, in accordance with embodiments described herein.
Figure 5:
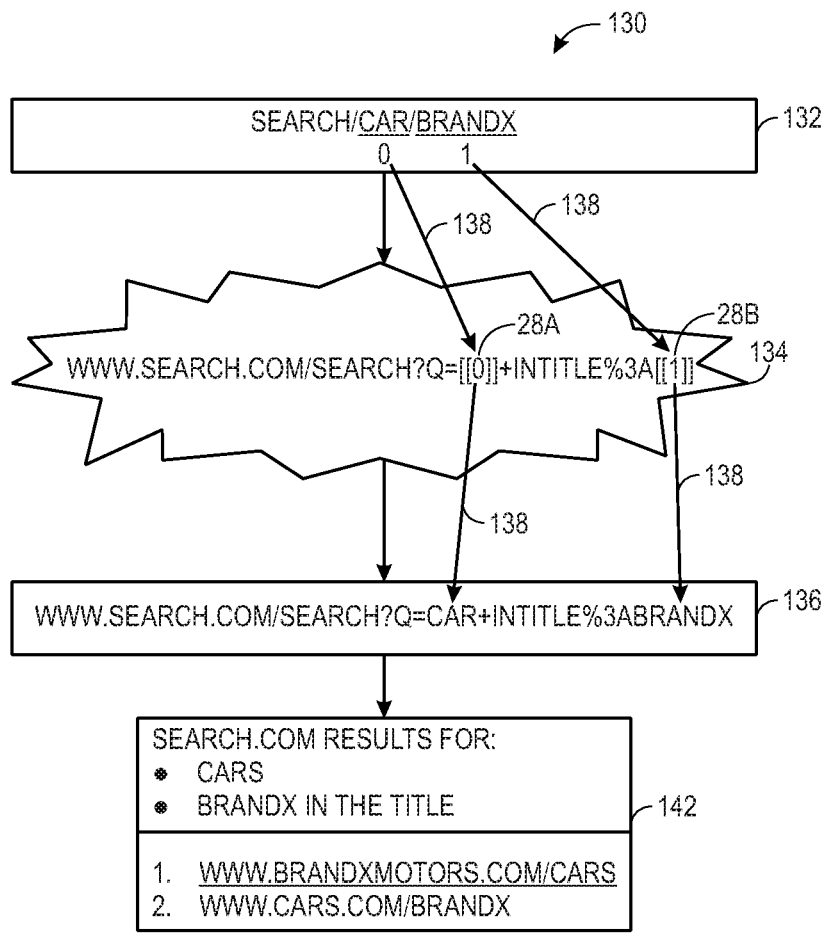
FIG. 5 is a block diagram, illustrating an example access of a resource using a parameter passing short locator, using the process of FIG. 4, in accordance with embodiments described herein.

Once the full resource locator is registered with an associated short resource locator, the short resource locator may be used to access the resource. FIG. 4 is a flowchart, illustrating a process 100 for accessing a resource, using a parameter passing short locator, in accordance with an embodiment. FIG. 5 is a block diagram, illustrating an example access 130 of a resource using a parameter passing short locator, using the process of FIG. 4. For clarity, these figures will be discussed together.

The process 100 starts by receiving (block 102), at the short locator service 20, the short locator and desired parameters from the client 16. For example, a user may provide the short resource locator and parameters 132 (e.g., "search/car/BrandX"). As mentioned above, the short resource locator and parameters 132 may be provided manually by a user, via a graphical user interface (GUI) and/or automatically, via executed code of the client 16 or processing component communicatively coupled to the client 16.

Once the short resource locator and parameters 132 are received, the short locator service 20 identifies the full resource locator associated with the short resource locator. For example, the short locator service 20 may query the resource locator association datastore 22 using the source resource locator 132 (e.g., without the parameters) to receive the associated full resource locator 134 that includes the parameter identifiers (e.g., 28A and 28B).

Once the full resource locator 134 is identified, the short locator service 20 merges (block 106) the received parameters into the full locator 134 to produce the completed full locator 136. FIG. 5 illustrates this merging using arrows 138. As illustrated, the ordering of the parameters provided with the short resource locator 132 is merged to the parameter indicators with the respective ordering. Thus, the first order parameter 140A is merged to the first order parameter indicator 28A. For example, "car" is inserted at " " in the full resource locator template 134. Further, the second order parameter 140B is merged to the second order parameter indicator 28B. Accordingly, "BrandX" may be inserted at " " in the full resource locator template 134. Additionally, as mentioned above, received parameters may be merged in multiple locations of the full resource locator template 134, when a parameter indicator (e.g., 28A) is used multiple times in the full resource locator template 134.

Once the merging is complete, the full resource locator 136 is generated. The full resource locator 136 identifies the resource location and any parameters to be applied to the resource. Accordingly, the short locator service 20 may, in response to receiving the short resource locator 132, return and/or redirect to the full resource locator 136 (block 108).

For example, the short locator service 20 may return, via an API, "www.search.com/search?q=car+intitle%3ABrandX". This may allow the client 16 to automatically request access to the resource via the returned full resource locator 136.

Additionally and/or alternatively, the short locator service may redirect the client 16 automatically to "www.search.com/search?q=car+intitle%3ABrandX". For example, to redirect, the short locator service 20 may issue a hypertext-transfer protocol (HTTP) response with a redirect (e.g., HTTP 301 or 302 response) with a target resource locator set as the full resource locator. The redirect may be a temporary redirect (e.g., via an HTTP 302 response) or a permanent redirect (e.g., via an HTTP 301 response). In the case of a temporary redirect, the client 16 will re-request the full resource locator 136 from the short locator service 20 each time the short resource locator 132 is used. However, when a permanent redirect is used, the client 16 may maintain the redirect, such that subsequent uses of the identical short resource locator 136 will be routed to the full resource locator without intervention from the short locator service 20.

This results in access to the resource, via the short resource locator and dynamically passed through parameters. Thus, as illustrated in FIG. 5, a GUI 142 with search results for cars with BrandX in the title are returned to the client 16.

The current techniques for providing short resource locators provide enhancements to computer networks, by enabling resource location in a new and improved manner, where parameters may be passed with a short resource locator, resulting in a dynamically changeable long resource locator. This results in significant data storage savings, by significantly reducing a number short resource locators associated with a long resource locator. Further, use of these short resource locators may enable easier resource access, by enabling less complex resource locators to be provided to a computer for resource retrieval.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors, cause the one or more processors to:
   receive, from a client computer system, a short resource locator that is associated with a full resource locator template in a resource locator association datastore;
   receive, from the client computer system, one or more parameters;
   identify an ordering of the one or more parameters using an order indication of the one or more parameters;
   identify the full resource locator template by querying the resource locator association datastore using the short resource locator, the full resource locator template comprising one or more parameter identifiers that identify locations in the full resource locator template to pass parameters to;
   identify an ordering of the one or more parameter identifiers using an ordering identifier of the one or more parameter identifiers;
   identify a correlation between the one or more parameter identifiers and the one or more parameters using the ordering of the one or more parameter identifiers and the ordering of the one or more parameters;
   generate a full resource locator, by replacing the one or more parameter identifiers with the one or more parameters using the correlation between the one or more parameter identifiers and the one or more parameters; and
   cause the client computer system to access a resource using the full resource locator.

2. The machine-readable medium of claim 1, comprising machine-readable instructions that, when executed by the one or more processors, cause the one or more processors to identify the one or more parameter identifiers based upon special characters that open, close, or both the locations in the full resource locator template.

3. The machine-readable medium of claim 2, wherein the special characters comprise double brackets, an asterisk, or both.

4. The machine-readable medium of claim 1, wherein the ordering identifier of the one or more parameter identifiers, comprises sequential numbers stored within the one or more parameter identifiers.

5. The machine-readable medium of claim 1, wherein the ordering identifier of the one or more parameter identifiers, comprises sequential alphabet characters stored within the one or more parameter identifiers.

6. The machine-readable medium of claim 1, wherein a common parameter identifier is used in at least two locations within the full resource locator template, such that the at least two locations are replaced with a single parameter mapped to the common parameter identifier during generation of the full resource locator.

7. The machine-readable medium of claim 1, wherein the short resource locator and each of the one or more parameters are separated by a forward-slash when received together from the client computer system.

8. The machine-readable medium of claim 1, wherein the full resource locator comprises a hypertext transfer protocol (HTTP) uniform resource locator (URL) and the short resource locator comprises a text string different than the HTTP URL.

9. The machine-readable medium of claim 1, comprising machine-readable instructions that, when executed by the one or more processors, cause the one or more processors to redirect the client computer system to the full resource locator by responding to the received short resource locator with a hypertext transfer protocol (HTTP) redirect response and a target uniform resource locator (URL) comprising the full resource locator.

10. The machine-readable medium of claim 9, wherein the HTTP redirect response comprises a temporary redirect that only redirects the short resource locator to the full resource locator once.

11. The machine-readable medium of claim 9, wherein the HTTP redirect response comprises a permanent redirect that redirects the short resource locator to the full resource locator permanently by sustaining the redirect at the client computer system.

12. The machine-readable medium of claim 1, comprising machine-readable instructions that, when executed by the one or more processors, cause the one or more processors to register the full resource locator template by associating a short resource locator proposal with the full resource locator template in the resource locator association datastore.

13. A system, comprising:
a resource locator association datastore, comprising a tangible, non-transitory, machine-readable medium;
a full resource locator template registration service, running on a hardware processor, configured to:
receive, from a full resource template registration device, a short locator proposal and a full resource locator template; and
associate the short locator proposal with the full resource locator template in the resource locator association datastore;
a short locator service, configured to:
receive, from a client computing device, comprising an electronic device, one or more parameters and a short locator that is the same as the short locator proposal;
identify an ordering of the one or more parameters using an order indication of the one or more parameters;
query the datastore for the full resource locator template using the short locator;
identify one or more parameter identifiers in the full resource template;
identify an ordering of the one or more parameter identifiers using an ordering identifier of the one or more parameter identifiers;
identify a correlation between the one or more parameter identifiers and the one or more parameters using the ordering of the one or more parameter identifiers and the ordering of the one or more parameters;
generate a full resource locator by replacing the one or more parameter identifiers of the full resource locator with the one or more parameters using the correlation between the one or more parameter identifiers and the one or more parameters; and
trigger access of a resource, by the client computing device, via the full resource locator.

14. The system of claim 13, wherein the full resource locator template registration service and the short locator service are hosted by a common computer system.

15. A computer-implemented method, comprising:
receiving, from a client computer system, a short resource locator that is associated with a full resource locator template in a resource locator association datastore;
receiving, from the client computer system, one or more parameters;
identifying an ordering of the one or more parameters using an order indication of the one or more parameters;
identifying the full resource locator template by querying the resource locator association datastore using the short resource locator, the full resource locator template comprising one or more parameter identifiers that identify locations in the full resource locator template to pass parameters to;
identifying an ordering of the one or more parameter identifiers using an ordering identifier of the one or more parameter identifiers;
identifying a correlation between the one or more parameter identifiers and the one or more parameters using the ordering of the one or more parameter identifiers and the ordering of the one or more parameters;
generating a full resource locator, by replacing the one or more parameter identifiers with the one or more parameters using the correlation between the one or more parameter identifiers and the one or more parameters; and
causing the client computer system to access a resource using the full resource locator.

16. The computer-implemented method of claim 15, wherein the one or more parameters and the short resource locator are received via an exposed application programming interface (API).

17. The computer-implemented method of claim 15, comprising:
redirecting the client computer system to the full resource locator by responding to the received short resource locator with a hypertext transfer protocol (HTTP) redirect response and a target uniform resource locator (URL) comprising the full resource locator.

* * * * *